United States Patent [19]
Yoshimura et al.

[11] Patent Number: 5,371,722
[45] Date of Patent: Dec. 6, 1994

[54] METHOD FOR RECORDING SECTOR CONTROL INFORMATION ON MAGNETO-OPTICAL DISK

[75] Inventors: Shunji Yoshimura; Toshiki Udagawa, both of Tokyo; Atsushi Fukumoto, Kanagawa, all of Japan

[73] Assignee: Sony Corporation, Japan

[21] Appl. No.: 106,487

[22] Filed: Aug. 13, 1993

Related U.S. Application Data

[63] Continuation of Ser. No. 834,881, Feb. 11, 1992, abandoned.

[30] Foreign Application Priority Data

Feb. 14, 1991 [JP] Japan .................. 3-042554

[51] Int. Cl.$^5$ .............................. G11B 13/04
[52] U.S. Cl. ......................... 369/13; 360/59
[58] Field of Search ................. 369/100, 110, 124, 13, 369/47, 48, 275.2, 275.3, 275.4, 14, 288, 275.1; 360/59, 114; 365/124

[56] References Cited

U.S. PATENT DOCUMENTS

| | | | |
|---|---|---|---|
| 4,730,289 | 3/1988 | Saitoh et al. | 369/13 |
| 4,925,717 | 5/1990 | Tsukamura et al. | 369/288 |
| 4,985,881 | 1/1991 | Saito et al. | 369/13 |
| 5,018,119 | 5/1991 | Aratani et al. | 369/13 |
| 5,050,144 | 9/1991 | Henderson et al. | 369/13 |
| 5,272,692 | 12/1993 | Henderson et al. | 369/13 |

FOREIGN PATENT DOCUMENTS

| | | |
|---|---|---|
| 0176755A3 | 4/1986 | European Pat. Off. . |
| 0193614 | 9/1986 | European Pat. Off. . |
| 0318925A3 | 6/1989 | European Pat. Off. . |
| 0319004A2 | 6/1989 | European Pat. Off. . |
| 415449A2 | 3/1991 | European Pat. Off. ............ 369/13 |
| 0492553A2 | 7/1992 | European Pat. Off. . |
| 0492581A2 | 7/1992 | European Pat. Off. . |
| 2110459A | 6/1983 | United Kingdom . |

OTHER PUBLICATIONS

Unique MO Disk Attains Super Resolution, Hi-Tech Report, JEE Aratani et al., May 1991.
Patent Abstracts of Japan–vol. 15, No. 274 (P-1226) Jul. 11, 1991 & JP-A-30 93 058 (Sony) Apr. 18, 1991.
2244 Research Disclosure (1991) Jul., No. 327, Emsworth, GB Optical Substrate Format for Track Density Doubling p. 549 Disclosed anonymously 327112.

Primary Examiner—Robert J. Pascal
Assistant Examiner—Tan Dinh
Attorney, Agent, or Firm—Limbach & Limbach

[57] ABSTRACT

Disclosed is a method for recording and reproducing sector control information to and from a novel magneto-optical disk to which the so-called erasure type data reproduction method or data-embossed type reproduction method applies. On the magneto-optical disk, sector control information is recorded onto a sector control information recording region at a track recording density lower than that of a data recording region. When data is recorded on the disk at a high track density, the sector control information is recorded in such a manner that the information will not exist on adjacent tracks along the same radials of the disk.

13 Claims, 6 Drawing Sheets

FIG. 3A
(PRIOR ART)
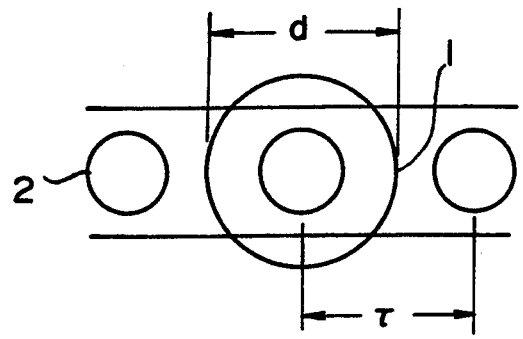
FIG. 3B
(PRIOR ART)
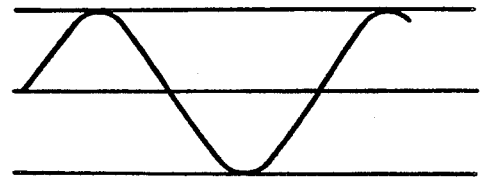
FIG. 3C
(PRIOR ART)
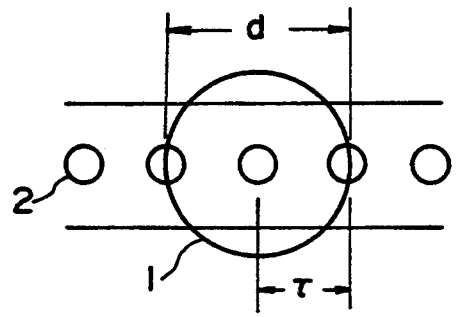
FIG. 3D
(PRIOR ART)

FIG. 4A
(PRIOR ART)
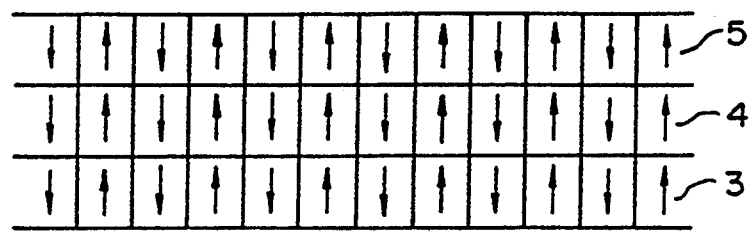
FIG. 4B
(PRIOR ART)
FIG. 4C
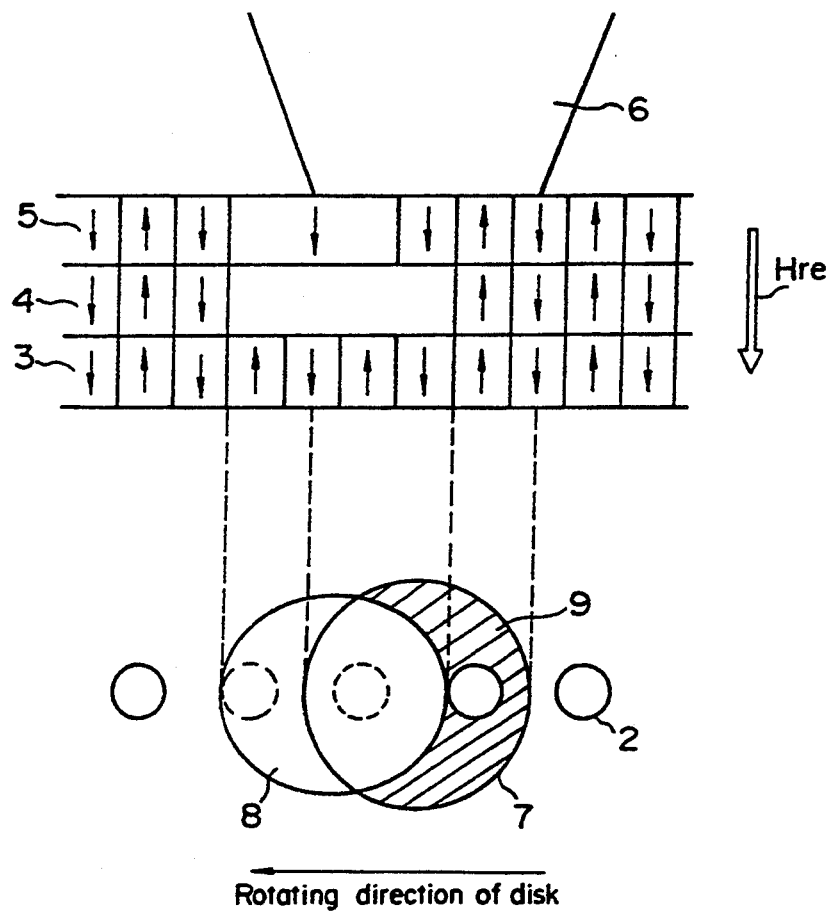
Rotating direction of disk

METHOD FOR RECORDING SECTOR CONTROL INFORMATION ON MAGNETO-OPTICAL DISK

This is a continuation of co-pending application Ser. No. 07/834,881 filed on Feb. 11, 1992 and now abandoned.

BACKGROUND OF THE INVENTION

1. Field of the Invention

The present invention relates to a method for recording sector control information onto a high density magneto-optical disk.

2. Description of the Prior Art

On the disk medium used as an external data storage device of computers, the track area is divided into sectors S of an appropriate length each for ease of data handling and data access, as shown in FIG. 1. Sector control information such as physical addresses on the disk D is recorded in each sector S so that data may be manipulated in units of sectors. The example of FIG. 1 depicts a CAV (constant angular velocity) type disk.

As outlined, each track of the disk D is usually divided into dozens of sectors for use. In the case of the magnetic disk, sector control information for each sector is recorded upon initialization and prior to the recording of data. For the optical disk, sector control information is written thereon in advance as embossed signals (pits made by pressing). The mode of storing sector control information as embossed signals also applies to the magneto-optical disk which permits subsequent recording of data.

FIG. 2 illustrates an ISO-standard sector format for the WO (write once) optical disk and MO (rewritable magneto-optical) disk. As shown, one sector is composed of a header part HD and a recording data part DA. The header part HD is recorded in advance as an embossed signal (pre-pits) onto the magneto-optical disk medium. The header part HD comprises a sector synchronizing part and an address part. The sector synchronizing part is used to provide a distinct demarcation between two sectors. The address part contains sector control information such as the physical address of the current sector on the disk. The physical address is illustratively composed of a track address and a sector address. In some cases, the physical address is a serial number representing the sector.

As described, the header part HD is conventionally recorded in advance as pre-pits. The header part HD is usually recorded at the same track recording density and using the same modulation method as the recording data part.

For example, the rewritable magneto-optical disk has a magneto-optical recording film. A laser beam is irradiated at the film for heating thereof. This causes the magnetized direction (i.e., recording pits) of the irradiated spot to reflect the externally applied magnetic field representing data. For reproduction, the laser beam is irradiated at a track of the recording pits. The reflected light has its plane of polarization rotated depending on the magnetized direction, a phenomenon known as the Kerr effect. Where the magneto-optical disk has a multiple layer structure such as one containing a reflection film in addition to the magneto-optical film, the Faraday effect is also applicable.

The track recording density at which information is recorded onto the magneto-optical disk is determined by the C/N (carrier to noise) ratio of a given reproduction signal. In the typical prior art setup for recording and reproducing data to and from the magneto-optical disk, a laser beam is irradiated at the disk surface to form a beam spot 1 thereon. The entire beam spot 1 provides a region from which to detect a reproduction signal, as shown in FIG. 3. Thus the reproducible track recording density is determined by the diameter of the laser beam spot.

For example, as depicted in FIG. 3(A), when the diameter d of the laser beam spot 1 is smaller than the pitch $\tau$ of recording pits 2, there is no possibility of two recording pits being included within the spot 1. In this case, the reproduction signal is read properly from the disk, with the reproduced output waveform occurring as shown in FIG. 3(B). If the recording pits are formed at a higher density, as in the case of FIG. 3(C) wherein the diameter d of the laser beam spot 1 is greater than the pitch $\tau$ of the recording pits 2, two recording pits are simultaneously covered by the spot 1. This results in a reproduced output waveform occurring as a substantially flat pattern, as depicted in FIG. 3(D), and no signal can be reproduced.

The spot diameter d depends on the wavelength $\lambda$ of the laser beam and on the numerical aperture (NA) of the objective lens used. Conventionally, the spot diameter d of the laser beam is reduced for higher recording density either by shortening the wavelength $\lambda$ of the laser beam or by increasing the NA of the objective lens. However, constraints posed by the construction of the laser source and optical system prevent such measures from achieving significantly higher recording densities.

The track density is primarily limited by the cross talk emanating from adjacent tracks. In the conventional setup, the amount of the cross talk also depends on the laser beam spot diameter d. This is another constraint on the effort to enhance recording density.

It was under such circumstances that this applicant proposed some time ago a magneto-optical disk and a method for reproducing data therefrom, the disk being constructed in such a manner that the readable track recording density and track density thereof were maximized without changing the laser beam spot diameter.

One aspect of the proposed method involves the use of a magneto-optical disk having a multiple layer structure comprising a recording layer 3, an intermediate layer 4 and a reproduction layer 5, as shown in FIG. 4(A). The Curie temperature involved is 300° C. for the recording layer 3, 120° C. for the intermediate layer 4, and 400° C. or higher for the reproduction layer 5.

With this magneto-optical disk, the recording layer 3, intermediate layer 4 and reproduction layer 5 are coupled magnetostatically or on a magneto-optical switching basis at room temperature before reproduction, as shown in FIG. 4(A). The recording pits of the recording layer 3 are all transcribed to the reproduction layer 5. The arrows in the figure indicate the directions of magnetization in the respective layers.

Upon reproduction, a laser beam 6 is irradiated at the magneto-optical disk under a reproducing magnetic field Hre, as depicted in FIG. 4(B). As shown in FIG. 4(C), the irradiation of the laser beam 6 produces in the intermediate layer 4 a domain whose temperature exceeds its Curie temperature. Meanwhile, the magneto-optical disk is rotating at high speed. Thus the high temperature domain 8 shifts in the rotating direction away from the position of the scanning spot 7 of the irradiated laser beam 6, as depicted in FIG. 4 (C). The amount of the shift corresponds to the linear speed of the magneto-optical disk.

In this high temperature domain (mask domain) 8, the temperature of the intermediate layer 4 is higher than Curie temperature Tc. Thus the magnetic property of that intermediate layer 4 is lost, as shown in FIG. 4 (B). In turn, the magnetic connection disappears between recording layer 3 and reproduction layer 5 within the domain 8. The magnetized direction of the reproduction layer 5 coincides with the reproducing magnetic field Hre. That is, the recording pits of the reproduction layer 5 are erased from the high temperature domain 8. The scanning spot 7 minus its portion overlapping with the domain 8 leaves out a part 9 that provides an actual reproduction region. In other words, the high temperature domain 8 masks part of the scanning spot 7 of the laser beam, leaving a smaller, unmasked part to form the reproduction region 9.

Under the scanning spot 7 of the laser beam, the smaller, unmasked reproduction region 9 reflects a light beam. The Kerr rotation angle of the reflected light is then detected for pit reproduction. This is equivalent to reducing the diameter d of the laser beam spot 7, which enhances track recording density.

The applicant proposes to call the data reproduction method described above an erasure type data reproduction method. The nomenclature will be used hereunder in this specification.

This applicant has also proposed a second method for data reproduction from the magneto-optical disk. This method is disclosed in Japanese Patent Application No. 1-229395.

According to the applicant's second method, the magneto-optical film of the disk is a laminated film principally comprising a recording layer and a reproduction layer. The recording layer and reproduction layer are coupled magnetostatically or on a magneto-optical switching basis. The Curie temperature of the reproduction layer is lower than that of the recording layer. At room temperature, the contents of the recording layer are magnetically transcribed to the reproduction layer.

This method works as follows. An initializing magnetic field is applied to the magneto-optical disk before reproduction. This orients the direction of magnetization of the reproduction layer in alignment with the initializing magnetic field, erasing the recording pits from the reproduction layer. The magnitude of the initializing magnetic field Hin is greater than that of the magnetic field Hcp for reversing the magnetized direction of the reproduction layer (Hin>Hcp), and is sufficiently smaller than the magnetic field Hcr for reversing the magnetized direction of the recording layer (Hin<<Hcr).

For reproduction, a laser beam is irradiated at the magneto-optical disk in the above-mentioned initialized state. As with the erasure type data reproduction method, the scanning spot shifts in the disk rotating direction by the amount reflecting the linear speed of the disk. The shifted portion (corresponding to the domain 8 of FIG. 4c) has a disk temperature higher than a predetermined temperature Ts. This reduces the coercive force of the reproduction layer under that portion. As a result, the recording pits of the recording layer are transcribed only to the reproduction layer of the portion whose temperature is higher than the predetermined temperature Ts; the recording pits are thus embossed into the reproduction layer. Part of the data-embossed domain overlaps with the laser beam spot. The overlapping part reflects a light beam. From the reflected light, the Kerr rotation angle of the plane of polarization is detected for data reproduction.

With the second method above, that part of the laser beam scanning spot which is not covered by the data-embossed domain whose temperature is higher than the predetermined temperature Ts, is called a masked domain; no recording pits appear in the masked domain. The overlapping part between data-embossed domain and beam spot becomes the reproduction region. Because this region is smaller in diameter than the beam spot, track recording density is enhanced in the same manner as with the erasure type data reproduction method.

With the second method, a reproduction region 18 is an overlapping part between the spot 16 and a data-embossed domain 17 smaller than that spot. Thus the reproduction region 18 becomes smaller in area than the spot 16 in the radial direction of the disk as well. This means that this method additionally permits track density to be raised.

In practice, a four-layer magneto-optical film is formed on the disk, as illustrated in FIG. 5. This film structure is adopted for two purposes: to stably maintain the initial state of the reproduction layer, and to transcribe recording pits properly from the recording layer upon reproduction.

As shown in FIG. 5, the magneto-optical disk according to the second method comprises a four-layer laminated film made of a recording layer 11, an intermediate layer 12, a reproduction support layer 13 and a reproduction layer 14. The Curie temperature involved is 250° C. for the recording layer 11, 250° C. for the intermediate layer 12, 120° C. for the reproduction support layer 13, and 300° C. or higher for the reproduction layer 14.

The recording layer 11 is a layer that contains recording pits free of the effects of initializing magnetic fields, reproducing magnetic fields or reproducing temperature. This layer retains sufficiently high coercive force at room temperature and at a reproducing temperature Ts.

The vertical anisotropy of the intermediate layer 12 is smaller than that of the reproduction support layer 13 or of the recording layer 11. For this reason, when a magnetic domain wall is formed between reproduction layer 14 and recording layer 11, that wall resides stably in the intermediate layer 12. This allows the reproduction layer 14 and reproduction support layer 13 to maintain their erased state (initial state) stably.

The reproduction support layer 13 is provided to reinforce the coercive force of the reproduction layer 14 at room temperature. This in turn stabilizes the reproduction layer 14 and reproduction support layer 13 in their direction of magnetization regardless of the presence of magnetic domain walls. Upon reproduction, the reproduction support layer 13 has its coercive force abruptly reduced near the reproducing temperature Ts. This allows the magnetic domain wall, contained within the intermediate layer 12, to expand into the reproduction support layer 13, ultimately reversing the reproduction layer 14 in its magnetized direction and thereby eliminating the magnetic domain wall. These steps cause recording pits to appear in the reproduction layer 14.

The reproduction layer 14 has a low reversible magnetic field Hcp even at room temperature and is subject to easy reversal of its magnetized direction. This means that the initializing magnetic field Hin orients the entire reproduction layer 14 in one direction of magnetization. Thus oriented, the magnetized direction of the reproduction layer 14 is kept stable, supported by the reproduction support layer 13 even if there exists a magnetic domain wall against the recording layer 11. As described, the magnetic domain wall between reproduction layer 14 and recording layer 11 disappears upon reproduction, allowing the recording pits to appear in the reproduction layer 14.

Prior to actual reproduction, the initializing magnetic field Hin initializes the reproduction layer 14 and the reproduction support layer 13, as illustrated in FIG. 6(A). At this point, the magnetic domain wall (indicated by horizontal arrows in FIG. 6) resides stably in the intermediate layer 12. The reproduction layer 14 and reproduction support layer 13 stably maintain their initialized state.

Next, as shown in FIGS. 6(B) and 6(C), a laser beam 15 is irradiated at a track of recording pits under a reproducing magnetic field Hre. The magnetic field Hre needs to be high enough to reverse the reproduction layer 14 and reproduction support layer 13 in their magnetized directions and to remove the magnetic domain wall from the intermediate layer 12 at a reproducing temperature Ts after the temperature rise following laser irradiation. The reproducing magnetic field Hre should not be high enough to reverse the reproduction support layer 13 entirely in its magnetized direction.

The temperature rise following irradiation of the laser beam 15 produces a data-embossed domain 17 in the magneto-optical disk, as described. This domain 17 is shifted in the disk rotating direction away from the beam scanning spot 16 and has a temperature higher than the reproducing temperature Ts. In the data-embossed domain 17, the coercive force of the reproduction support layer 13 (shown shaded in FIG. 6(C)) is reduced. Because the reproducing magnetic field Hre is smaller than the switching connection force between recording layer 11 and reproduction layer 14, the magnetic domain wall disappears from this portion of the reproduction support layer 13. This triggers transcription of the recording pits from the recording layer 11 to the reproduction layer 14; the recording pits thus appear in the reproduction layer 14. Of the scanning spot 16, a portion 18 which overlaps with the data-embossed domain 17 becomes an actual reproduction region. That is, all area of the laser beam scanning spot 16 excluding the portion 18 overlapping with the data-embossed domain 17 is masked. The overlapping portion 18 thus turns into the reproduction region.

The small reproduction region 18 where the laser beam scanning spot 16 overlaps with the data-embossed domain 17 reflects a light beam. From the reflected light, the Kerr rotation angle is detected so as to reproduce the recording pits. This is equivalent to reducing the diameter d of the laser beam spot 16, which enhances both track recording density and track density.

The applicant proposes to call the above-described second method a data-embossed type reproduction method. The nomenclature will also be used hereunder in this specification.

As described and according to the erasure type data reproduction method and data-embossed type reproduction method, the track recording density and track density involved may be enhanced without the need to reduce the diameter of the laser beam scanning spot.

However, the above-described two methods have experienced troubles in connection with the recording of the header part HD containing sector control information. When the header part HD is recorded beforehand on the magneto-optical disk as an embossed signal, neither method can be used to reproduce the header part. Where the header part HD is recorded at the same track recording density as the recording data part DA, the header part HD cannot be reproduced properly.

SUMMARY OF THE INVENTION

It is therefore an object of the present invention to provide a method for recording sector control information as a header part of a magneto-optical disk in such a manner that the recorded sector control information will be properly reproduced when the above-described erasure type data reproduction method or data-embossed type reproduction method is employed to reproduce data from the disk.

In carrying out the invention and according to one aspect thereof, there is provided a method for recording sector control information onto a magneto-optical disk that may be handled with the erasure type data reproduction method or data-embossed type reproduction method, the sector control information being recorded prior to the recording of data and at a track recording density lower than that of the data.

According to another aspect of the invention, there is provided a method for recording sector control information onto a magneto-optical disk that may be handled with the data-embossed type reproduction method not only for higher track recording density but also for higher track density, the sector control information being recorded between contiguous tracks in such a manner that none of the recorded information will exist at the same angular position, i.e. radials on the disk in order to avoid cross talk from the information recorded in the adjacent tracks.

According to a further aspect of the invention, there is provided a method for recording sector control information onto a magneto-optical disk, the information being recorded in such a manner that it will be reproduced in the same way as recorded data.

According to the invention, sector control information is recorded on the magneto-optical disk at a track recording density lower than that of recorded data. This scheme allows the recorded information to be reproduced by the conventional method that utilizes reflected light from the entire area of the laser beam spot for data reproduction. Thus sector control information is properly reproduced from the disk regardless of the track recording density of recorded data.

Where track density is increased, no sector control information exists between contiguous tracks in the same rotating direction of the magneto-optical disk. This eliminates the possibility of the cross talk emanating from adjacent tracks containing the sector control information.

Where sector control information is so recorded as to be subsequently reproduced by the erasure type data reproduction method or data-embossed type reproduction method, the information is recorded at the same track recording density and track density as recorded data. This ensures appropriate reproduction of the sector control information.

These and other objects, features and advantages of the invention will become more apparent upon a read-

BRIEF DESCRIPTION OF THE DRAWINGS

FIGS. 3A-3D are a set of views describing the relationship between the laser beam spot diameter and the recording density of reproducible recording pits;

FIGS. 4A-4C are a set of views illustrating how recordings are reproduced by the erasure type data reproduction method and in which regions of the magneto-optical disk such reproduction actually takes place;

DESCRIPTION OF THE PREFERRED EMBODIMENT

Preferred embodiments of the invention as it relates to a method for recording sector control information to a magneto-optical disk will now be described with reference to the accompanying drawings.

Figure 1:
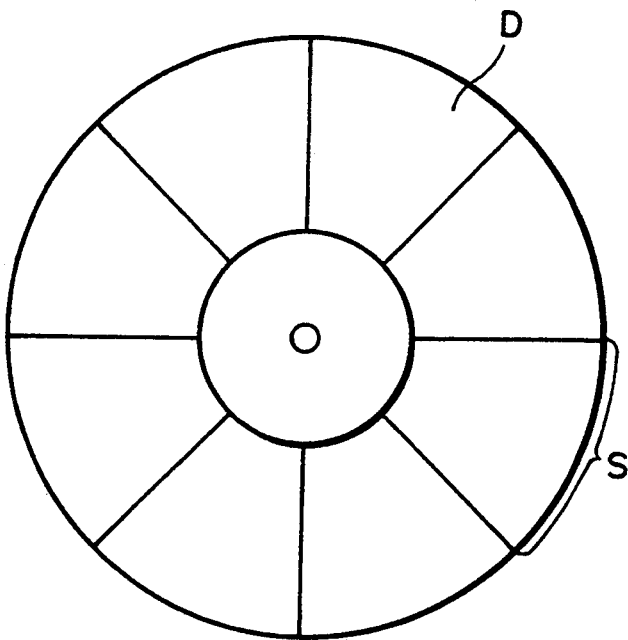
FIG. 1 is a view indicating a typical sector format of the magneto-optical disk.
Figure 2:
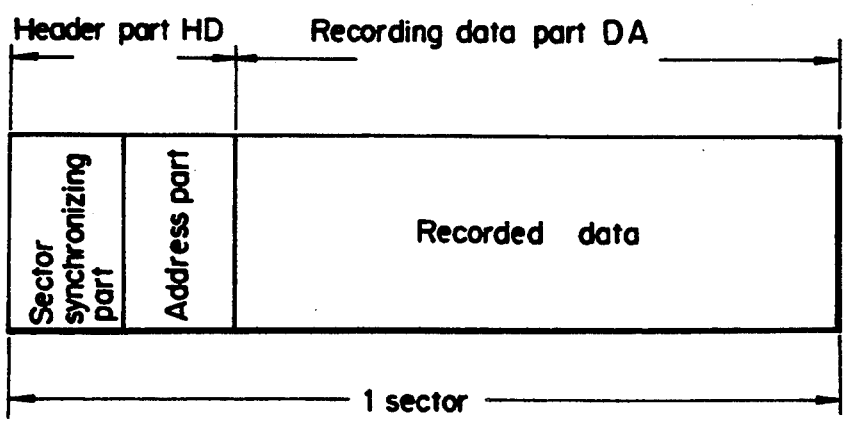
FIG. 2 is a view representing a typical format of a single sector on the magneto-optical disk.
Figure 5:
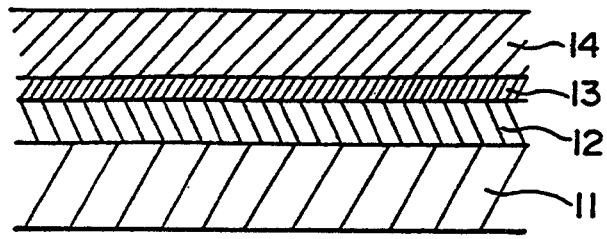
FIG. 5 is a view showing a typical magneto-optical disk whose recordings are reproduced by the data-embossed type reproduction method.
Figure 6A:
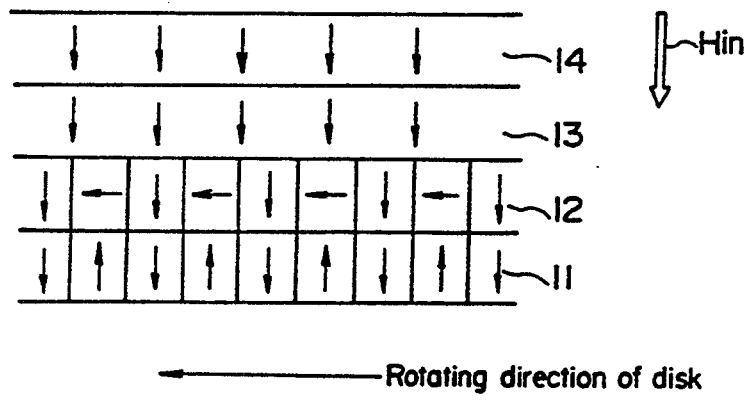
FIGS. 6A-6C are a set of views depicting how recordings are reproduced by the data-embossed type reproduction method and in which regions of the magneto-optical disk such reproduction actually takes place.
Figure 6B:
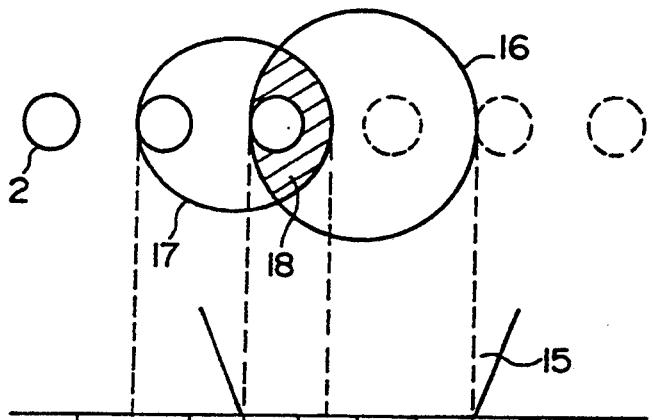
Figure 6C:
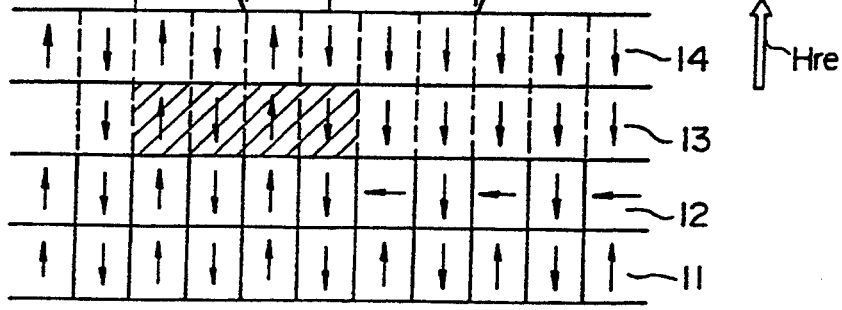
Figure 7:
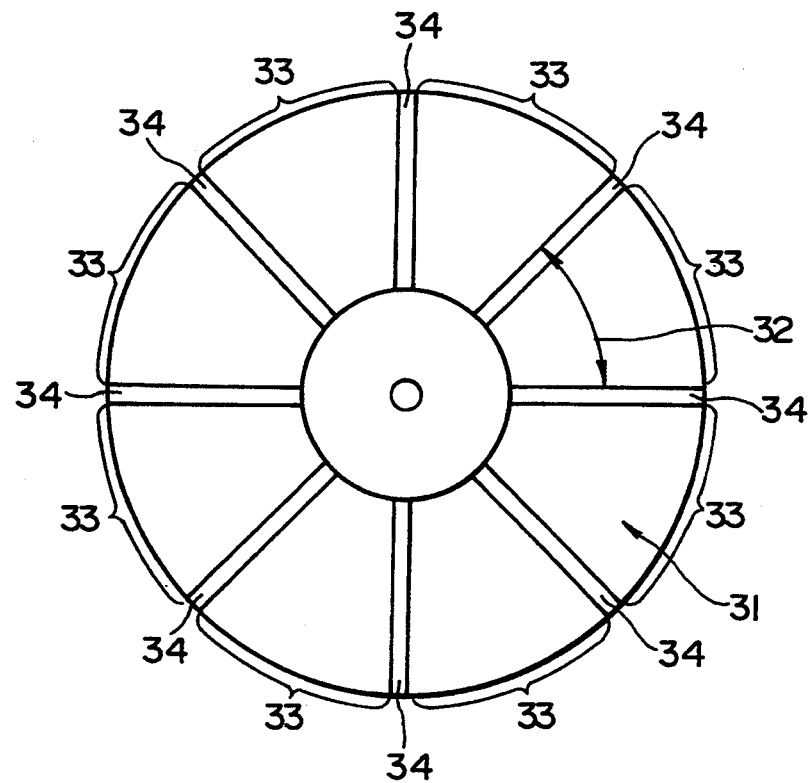
FIG. 7 is a view depicting a first embodiment of the invention as it relates to recording sector control information onto the magneto-optical disk.

FIG. 7 shows a first embodiment of the invention. In FIG. 7, reference numeral 31 is a magneto-optical disk on which a magneto-optical recording film is formed, the disk being handled with the above-described erasure type data reproduction method or data-embossed type reproduction method.

The magneto-optical disk to which the erasure type data reproduction method applies illustratively comprises a recording layer made of TbFeCo, an intermediate layer of TbFeCoAl and a reproduction layer of GdFeCo. The Curie temperature involved is 300° C. for the recording layer, 120° C. for the intermediate layer, and 400° C. or higher for the reproduction layer. The magneto-optical disk to which the data-embossed type reproduction method applies illustratively comprises a recording layer made of TbFeCo, an intermediate layer of GdFeCo, a reproduction support layer of TbFeCoAl and a reproduction layer of GdFeCo. The Curie temperature is 250° C. for the recording layer, 250° C. for the intermediate layer, 120° C. for the reproduction support layer, and 300° C. or higher for the reproduction layer.

As depicted in FIG. 7, data is recorded in a recording data region 33 (corresponding to recording data part DA) of each sector 32 on the magneto-optical disk 31. The recording is performed at a high track recording density that permits reproduction of the recorded data using reflected light only from the reproduction regions 9 and 18 mentioned above. Each reproduction region is smaller in diameter than the spot of the laser beam applied.

A header region 34 on the disk 31 corresponds to the header part HD. To the header region 34, sector information such as the physical address of each sector is recorded beforehand as pre-pits in an embossed manner. The recording of the information is carried out at a track recording density lower than that of the recording data region 33. This scheme is used to permit data reproduction by the conventional method that utilizes reflected light from the entire spot of the laser beam applied.

In such cases, the modulation codes for the information recorded in the data region 33 are kept the same as those for the information recorded in the header region 34. The channel frequency for the sector control information recorded in the header region 34 is set for a level obtained by dividing, by an integer factor, the channel frequency for the data recorded in the recording data region 33 (e.g., channel frequency for sector control information may be set for half of that for recorded data).

Because the modulation codes for the information recorded in the data region 33 are kept the same as those for the information recorded in the header region 34, a greater part of circuitry may be shared by two reproduction systems for the two regions despite the fact that track recording densities are different between the two regions. With the channel frequency for sector control information set for a level obtained by dividing the frequency for data by an integer factor, channel readout clock signals are readily switched for reproduction between header part HD and data part DA simply by changing the dividing ratio of a PLL circuit. For these reasons, there is no need to provide two clock generators for the data region 33 and header region 34. The result is a much more simplified system construction.

An obvious alternative is to switch modulation code systems between header region 34 and data region 33 with respect to the recording signal received.

With the above-described first embodiment, the magneto-optical disk 31 may be driven either by CAV (constant angular velocity) or CLV (constant linear velocity) driving method.

As described, the magneto-optical disk that adopts the data-embossed type reproduction method has data recorded thereon not only at a higher track recording density but also at a higher track density than conventional magneto-optical disks. For example, the track density of the magneto-optical disk under the above method may be 1/N of that of conventional magneto-optical disks. However, if the header part HD is to be embossed as pre-pits on the disk beforehand, the data-embossed type reproduction method cannot be used to reproduce sector control information from the header region 34 containing the header part HD. Where the track pitch is shortened in order to raise the track density, attempts to reproduce the information from the header region 34 using the entire diameter of the laser beam spot are hampered by cross talk emanating from adjacent tracks. This problem is resolved by a second embodiment of the invention, as described below.

The second embodiment of the invention also involves recording sector control information into each header region in the same manner as the first embodiment. That is, sector control information is embossed in the header region as pre-pits at a track recording density lower than that of the recording data region.

What primarily differentiates the second embodiment from the first is that the second embodiment utilizes a multiple beam scheme. This scheme involves scanning N contiguous tracks simultaneously with laser beams. The N tracks, arranged in parallel, may be formed either spirally or concentrically for scanning by the N laser beams. A header region is provided on every other track, one of every multiple tracks, or one of the N tracks in each track group. Sector control information is recorded only to that track containing the header region.

For example, assume that the header region is formed on one of the N tracks constituting each track group. That is, the header region is located on one of every N tracks of the magneto-optical disk. Also assume that the sector control information contained in the header region is read by one of the N laser beams. In this example, the sector control information is uniquely determined in units of N tracks for recording and reproduction.

In the case above, the header region containing the sector control information is located on one of every N tracks and not found on adjacent tracks. Thus there occurs no cross talk emanating from the header region of any adjacent tracks. It should be noted that a given track whose adjacent track contains the header region may not be used for recording or reproducing data because of the cross talk involved. This, however, will not reduce overall recording capacity appreciably because the track density boosted by use of the data-embossed type reproduction method more than compensates for such losses in capacity.

Figure 8:
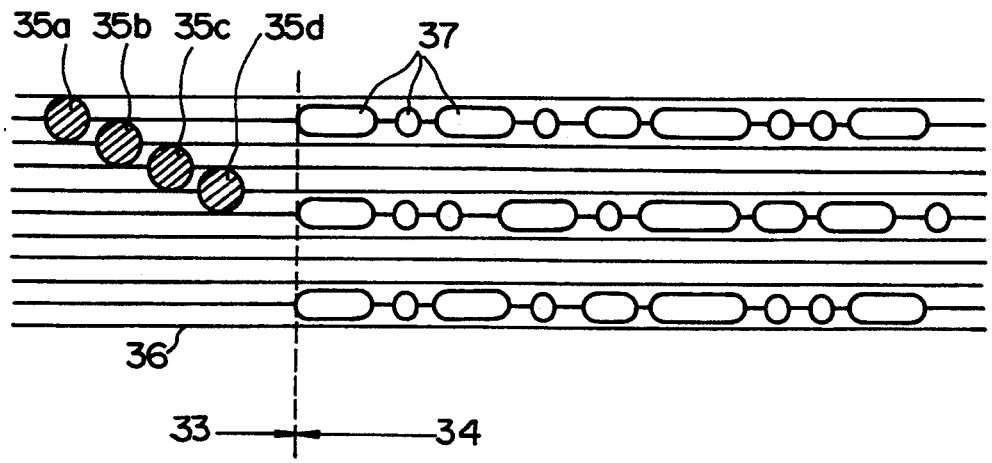
FIG. 8 is a view showing a second embodiment of the invention.

FIG. 8 depicts the second embodiment that uses four laser beams for reading purposes. In FIG. 8, reference numerals 35a, 35b, 35c and 35d indicate the scanning spots of the respective laser beams. Horizontal solid lines 36 are a virtual center line of each track. In this example, as illustrated, the header part HD (i.e., sector control information) is recorded in embossed fashion as pre-pits 37 only on the track scanned by the spot 35a within the header region 34 of FIG. 8.

In the example above, the spot 35b adjacent to the track scanned by the spot 35a and that part of the header region 34 which is scanned by the spot 35d are not used for recording or reproducing data. This measure is taken in order to prevent the cross talk from the header part HD going into the recording data reproduction signal.

In the setup above, the header part HD read by the spot 35a provides the sector control information that uniquely determines the physical addresses of all four laser beams. This permits appropriate recording or reproduction as desired.

Because the sector control information is formed every four tracks, there is no possibility of cross talk emanating from the header region of adjacent tracks. Even if data is recorded in an adjacent track, the different reproduction methods for data and sector control information virtually preclude any adverse effects on the sector control information upon reproduction. With the second embodiment, there is no data recorded in the header region. This means the sector control information is reproduced with no trouble whatsoever from the header region.

A third embodiment of the invention also involves the use of the data-embossed type reproduction method for enhancing track density. Sector control information is properly reproduced while the cross talk emanating from the header part HD is avoided between tracks.

The third embodiment operates primarily on the same principles as the first: sector control information is recorded as pre-pits in embossed fashion in the header part HD at a track recording density lower than that of the recording data part DA. What characterizes the third embodiment is that the header region containing the header part HD on a given track is not positioned at the same angular position, i.e. radial for adjacent tracks, i.e., in the same radial direction. This avoids the adverse effects of cross talk from the adjacent tracks. A single laser beam is sufficient for use by the third embodiment.

Figure 9:
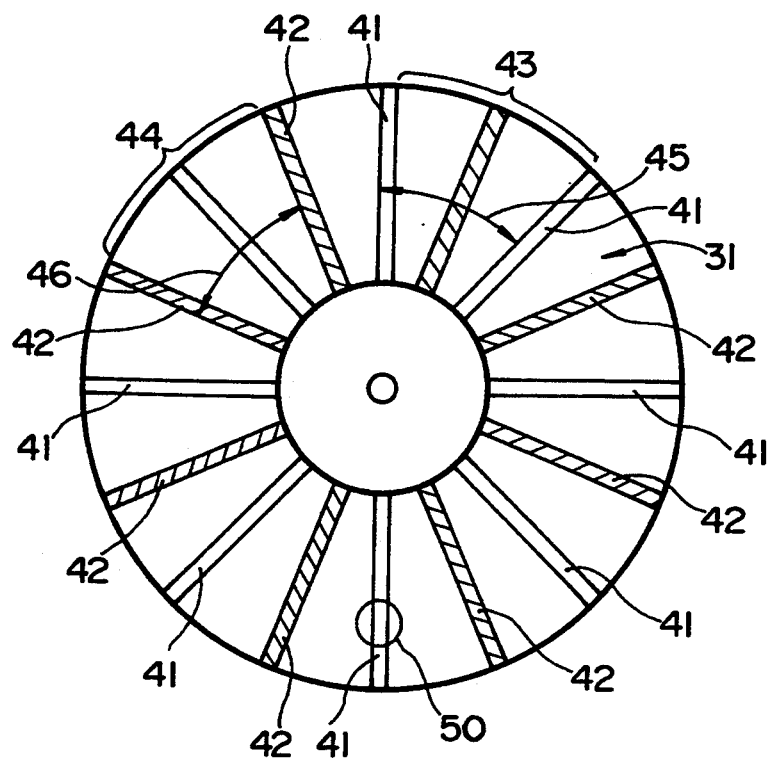
FIG. 9 is a view illustrating a third embodiment of the invention.
Figure 10:
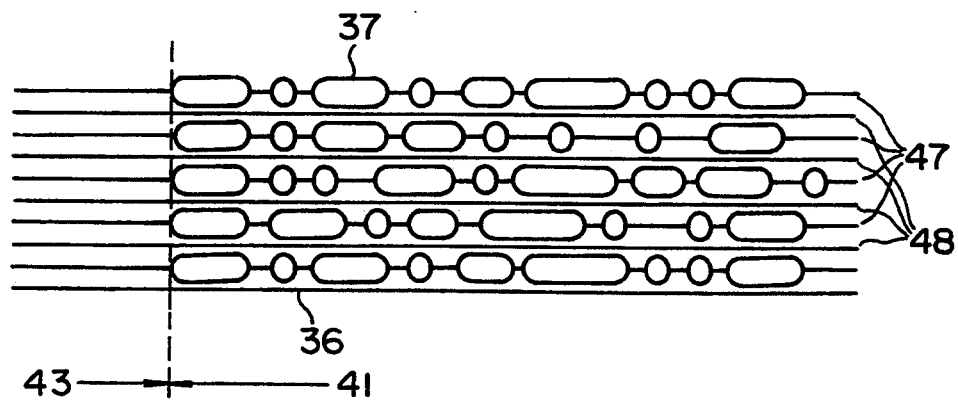
FIG. 10 is an enlarged view of a portion in FIG. 9.

FIGS. 9 and 10 illustrate the third embodiment as it relates to the magneto-optical disk 31 that adopts the data-embossed type reproduction method. The track density in this case is twice the normal track density for a given laser beam spot diameter. Here, odd-numbered tracks 47 and even-numbered tracks 48 as counted from the scanning start side (e.g., from innermost disk track) have header regions containing the header part HD at different angular locations, i.e. radials on the disk 31 between tracks.

That is, in FIG. 9, a blank portion 41 in the radial direction of the disk 31 is the header region for odd-numbered tracks in a sector 45. A portion 43 is the data region of the odd-numbered tracks. A shaded portion 42 in the radial direction of the disk 31 is the header region for even-numbered tracks in a sector 46. A portion 44 is the data region of the even-numbered tracks. In other words, the header region 41 has its header part HD embossed as pre-pits for the odd-numbered tracks only; the header region 42 has its header part HD embossed as pre-pits for the even-numbered tracks only.

FIG. 10 is an enlarged view of a portion 50 in FIG. 9. As shown in FIG. 4, the header region 41 contains sector control information for the odd-numbered tracks 47 only and not for the even-numbered tracks.

As described, where sector control information is embossed as pre-pits at locations in different rotating directions between tracks, the header part HD is not located in the radial same position between adjacent tracks. Thus there is no possibility of adverse effects resulting from cross talk.

With the third embodiment, tracks are formed concentrically so as to improve the capacity for recording data. Where tracks are formed in spiral fashion, there is a region shorter than a single sector immediately after the laser beam spot shifts from an odd-numbered track to an even-numbered track or vice versa. That shorter region cannot be used as a sector. This means some reductions are unavoidable in data recording capacity. However, the increase in capacity due to the boosted track density more than compensates for such losses. Overall, the third embodiment provides a magneto-optical disk of significantly enhanced recording density.

As one modification of the invention, sector control information is recorded to the header region so as to be subsequently reproduced therefrom in the same manner in which data is reproduced by the erasure type data reproduction method or data-embossed type reproduction method. The sector control information is recorded at the same track recording density and with the same code modulation method as the recorded data.

In this case, there exists no difference in terms of optical frequency characteristics between header part HD and data part HA. This permits efficient sector control over a magneto-optical disk of high track recording density and high track density.

For the modified setup above, the header part HD may be recorded on the magneto-optical disk upon shipment thereof from the factory. Alternatively, the header part HD may be written to a blank disk when it is formatted by a disk recording and reproducing apparatus.

As described and according to the invention, sector control information is managed efficiently and appropriately on a magneto-optical disk to and from which data may be recorded and reproduced at high track recording density and high track density by the erasure type data reproduction method or data-embossed type reproduction method. One significant advantage of the magneto-optical disk, to which this invention applies, is the ability to record and reproduce large quantities of data. With the invention practiced as described, that advantage will be all the more pronounced for effective data storage.

Although the specification and claims refer to "concentric tracks" or a "plurality of tracks," it will be understood that such phrases can also refer to the turns of a single, spiral track.

As many apparently different embodiments of this invention may be made without departing from the spirit and scope thereof, it is to be understood that the invention is not limited to the specific embodiments thereof except as defined in the appended claims.

What is claimed is:

1. A method for recording and reproducing data and sector control information on a magneto-optical disk of the type comprising a recording layer for recording data and a reproduction layer, the method comprising the steps of:
   recording sector control information on the disk in an embossed fashion prior to recording data on the disk, the sector control information being recorded on the disk in such a manner that no other sector control information is recorded on an adjacent track along a same radial of the disk;
   after the step of recording the sector control information on the disk, recording data on the disk;
   applying a magnetic field to the disk to orient the reproduction layer in one direction of magnetization;
   irradiating a light beam onto a region on the disk surface so as to raise the temperature above a predetermined temperature level within a beam spot on the region and thereby to transfer data from the recording layer to the reproduction layer under the beam spot;
   reproducing the sector control information from the disc by scanning a light beam along the recording tracks and detecting the reflected light; and
   using the reproduced sector control information, reproducing the transferred data from the data-filled domain of the reproduction layer.

2. A method for recording and reproducing data and sector control information on a magneto-optical disk of the type comprising a recording layer for recording data and a reproduction layer, the method comprising the steps of:
   recording sector control information on the disk in an embossed fashion prior to recording data on the disk, the sector control information being recorded on the disk along a first set of radials on the disk for all odd numbered recording tracks, counting from an innermost recording track, and recording sector control information along a second set of radials on the disk for all even numbered tracks, counting from an innermost recording track, wherein the first set of radials is angularly offset in a rotational direction of the disk from the first set of radials, the sector control information being recorded on the disk in such a manner that no other sector control information is recorded on an adjacent track along a same radial of the disk;
   after the step of recording the sector control information on the disk, recording data on the disk;
   applying a magnetic field to the disk to orient the reproduction layer in one direction of magnetization;
   irradiating a light beam onto a region on the disk surface so as to raise the temperature above a predetermined temperature level within a beam spot on the region and thereby to transfer data from the recording layer to the reproduction layer under the beam spot;
   reproducing the sector control information from the disc by scanning a light beam along the recording tracks and detecting the reflected light; and
   using the reproduced sector control information, reproducing the transferred data from the data-filled domain of the reproduction layer.

3. A method for recording and reproducing data and sector control information on a magneto-optical disk of the type comprising a recording layer for recording data and a reproduction layer, the recording layer being magnetically connected to the reproduction layer in a steady state, the method comprising the steps of:
   recording sector control information on the disk in an embossed fashion prior to recording data on the disk, the sector control information being recorded on the disk in such a manner that no other sector control information is recorded on an adjacent track along a same radial of the disk;
   after the step of recording the sector control information on the disk, recording data on the disk;
   irradiating a light beam onto a region on the disk surface so as to raise the temperature above a predetermined temperature level within the beam spot on the region and thereby to erase a magnetic connection between the recording layer and the reproduction layer under the beam spot;
   reproducing the sector control information from the disc by scanning a light beam along the recording tracks and detecting a reflected light; and
   using the reproduced sector control information, reproducing data from the region excluding the beam spot containing no magnetic connection following the erasure, the data being read from the recording layer by way of the reproduction layer.

4. A method for recording and reproducing data and sector control information on a magneto-optical disk according to claim 3, wherein the steps of recording the sector control information and of recording the data comprise:
   recording the sector control information at a first predetermined track recording density;
   recording data on the disk in the recording layer at a second predetermined track recording density which is higher than the first predetermined track recording density.

5. A method for recording and reproducing data and sector control information on a magneto-optical disk according to claim 3, wherein the step of recording the sector control information comprises recording sector control information having a first predetermined channel frequency equal to a second predetermined channel frequency of the recorded data divided by an integer greater than 1.

6. A method for recording and reproducing data and sector control information on a magneto-optical disk according to claim 1, wherein during the steps of recording the sector control information and recording the data, modulation codes which are the same are used.

7. A method for recording and reproducing data and sector control information on a magneto-optical disk according to claim 2, wherein the steps of recording the sector control information and of recording the data comprise:
    recording the sector control information at a first predetermined track recording density;
    recording data on the disk in the recording layer at a second predetermined track recording density which is higher than the first predetermined track recording density.

8. A method for recording and reproducing data and sector control information on a magneto-optical disk according to claim 2, wherein the step of recording the sector control information comprises recording sector control information having a first predetermined channel frequency equal to a second predetermined channel frequency of the recorded data divided by an integer greater than 1.

9. A method for recording and reproducing data and sector control information on a magneto-optical disk according to claim 2, wherein during the steps of recording the sector control information and recording the data, modulation codes which are the same are used.

10. A method for recording and reproducing data and sector control information on a magneto-optical disk of the type comprising a recording layer for recording data and a reproduction layer, the recording layer being magnetically connected to the reproduction layer in a steady state, the method comprising the steps of:
    recording sector control information on the disk in an embossed fashion prior to recording data on the disk, the sector control information being recorded on the disk along a first set of radials on the disk for all odd numbered recording tracks, counting from an innermost recording track, and recording sector control information along a second set of radials on the disk for all even numbered tracks, counting from an innermost recording track, wherein the first set of radials is angularly offset in a rotational direction of the disk from the first set of radials, the sector control information being recorded on the disk in such a manner that no other sector control information is recorded on an adjacent track along a same radial of the disk;
    after the step of recording the sector control information on the disk, recording data on the disk;
    irradiating a light beam onto a region on the disk surface so as to raise the temperature above a predetermined temperature level within the beam spot on the region and thereby to erase a magnetic connection between the recording layer and the reproduction layer under the beam spot;
    reproducing the sector control information from the disc by scanning a light beam along the recording tracks and detecting a reflected light; and
    using the reproduced sector control information, reproducing data from the region excluding the beam spot containing no magnetic connection following the erasure, the data being read from the recording layer by way of the reproduction layer.

11. A method for recording and reproducing data and sector control information on a magneto-optical disk according to claim 10, wherein the steps of recording the sector control information and of recording the data comprise:
    recording the sector control information at a first predetermined track recording density;
    recording data on the disk in the recording layer at a second predetermined track recording density which is higher than the first predetermined track recording density.

12. A method for recording and reproducing data and sector control information on a magneto-optical disk according to claim 10, wherein the step of recording the sector control information comprises recording sector control information having a first predetermined channel frequency equal to a second predetermined channel frequency of the recorded data divided by an integer greater than 1.

13. A method for recording and reproducing data and sector control information on a magneto-optical disk according to claim 10, wherein during the steps of recording the sector control information and recording the data, modulation codes which are the same are used.

* * * * *